(12) United States Patent
Blom

(10) Patent No.: US 10,266,228 B2
(45) Date of Patent: Apr. 23, 2019

(54) DRIVE TRAIN FOR A TREADLE SCOOTER

(71) Applicant: Easy2.Company B.V., Heerhugowaard (NL)

(72) Inventor: Gerardus Johannes Christiaan Blom, Heerhugowaard (NL)

(73) Assignee: Easy2.Company B.V., Heerhugowaard (NL)

( * ) Notice: Subject to any disclaimer, the term of this patent is extended or adjusted under 35 U.S.C. 154(b) by 473 days.

(21) Appl. No.: 15/192,858

(22) Filed: Jun. 24, 2016

(65) Prior Publication Data

US 2017/0369121 A1    Dec. 28, 2017

(51) Int. Cl.

| F16H 31/00 | (2006.01) |
|---|---|
| B62M 1/28 | (2013.01) |
| B62M 3/06 | (2006.01) |
| B62M 23/00 | (2006.01) |
| A63C 17/12 | (2006.01) |
| B62M 1/30 | (2013.01) |
| B62K 3/00 | (2006.01) |

(52) U.S. Cl.
CPC .............. *B62M 1/28* (2013.01); *A63C 17/12* (2013.01); *B62K 3/002* (2013.01); *B62M 1/30* (2013.01); *B62M 3/06* (2013.01); *B62M 23/00* (2013.01); *F16H 31/001* (2013.01); *B62M 2700/006* (2013.01)

(58) Field of Classification Search
CPC .. B62M 1/28; B62M 1/30; B62M 3/06; A63C 17/12; B62K 1/30; F16H 31/001
See application file for complete search history.

(56) References Cited

U.S. PATENT DOCUMENTS

| 2,466,105 | A | * | 4/1949 | Hoffman | ............ | B62K 3/002 |
|---|---|---|---|---|---|---|
| | | | | | | 280/221 |
| 2,508,189 | A | | 5/1950 | Pierce | | |
| 2,723,131 | A | | 11/1955 | McChesney | | |
| 4,186,934 | A | | 2/1980 | Collings | | |
| 4,828,284 | A | * | 5/1989 | Sandgren | ............ | B62K 3/002 |
| | | | | | | 280/221 |
| 5,192,089 | A | | 3/1993 | Taylor | | |
| 6,189,907 | B1 | | 2/2001 | Nelson | | |
| 6,419,251 | B1 | | 7/2002 | Chueh | | |
| 6,481,729 | B2 | | 11/2002 | Herman | | |
| 6,609,721 | B2 | | 8/2003 | Clift | | |
| 7,111,860 | B1 | * | 9/2006 | Grimaldos | ............ | B62K 3/002 |
| | | | | | | 280/221 |

(Continued)

FOREIGN PATENT DOCUMENTS

| CN | 2414981 Y | 1/2001 |
|---|---|---|
| CN | 2460427 Y | 11/2001 |

(Continued)

OTHER PUBLICATIONS

International Search Report from PCT/US2009/053093, dated Mar. 22, 2010.
Notice of Opposition from EP2389309B1 dated Jul. 22, 2015.

*Primary Examiner* — David M Fenstermacher
(74) *Attorney, Agent, or Firm* — Adsero IP

(57) ABSTRACT

A drive train for a treadle scooter using a locking roller clutch on each side of a drive wheel substantially equalizes drive line pull at actuation pulleys operatively associated with the locking roller clutches as a user pivots a rocker board having its ends attached to ends of the drive line.

9 Claims, 7 Drawing Sheets

(56) References Cited

U.S. PATENT DOCUMENTS

| | | | |
|---|---|---|---|
| 7,914,027 B2 | 3/2011 | Yu | |
| D640,754 S | 6/2011 | Yu | |
| D691,686 S | 10/2013 | Yu | |
| 2001/0030405 A1 | 10/2001 | Wu | |
| 2004/0129471 A1 | 7/2004 | Cheng | |
| 2010/0197790 A1 | 8/2010 | Zoppetti | |
| 2017/0369121 A1 * | 12/2017 | Blom | ................ B62M 1/28 |

FOREIGN PATENT DOCUMENTS

| | | | | |
|---|---|---|---|---|
| CN | 2475654 Y | | 2/2002 | |
| CN | 2706392 Y | | 6/2005 | |
| CN | 1237990 C | | 1/2006 | |
| CN | 200530074144.3 | | 9/2006 | |
| CN | 200630022172.5 | | 8/2007 | |
| CN | 101108642 A | | 1/2008 | |
| CN | 101161538 A | | 4/2008 | |
| CN | 200830096711.9 | | 4/2008 | |
| CN | 101177157 A | | 5/2008 | |
| CN | 101209738 A | | 7/2008 | |
| CN | 101224775 A | | 7/2008 | |
| CN | 101264776 | | 9/2008 | |
| CN | 200930100894.1 | | 8/2009 | |
| CN | 201427644 Y | | 3/2010 | |
| CN | 201561085 | | 8/2010 | |
| CN | 201020193222.7 | | 2/2011 | |
| CN | 103933725 A | | 7/2014 | |
| CN | 2803904 Y | | 7/2015 | |
| CN | 200710156429.X | | 4/2018 | |
| DE | 1454962 U | | 1/1939 | |
| DE | 806945 C | | 6/1995 | |
| DE | 20115012 U1 | | 9/2001 | |
| EP | 2389309 B1 | | 7/2015 | |
| FR | 2791315 A1 | * | 9/2000 | ............ B62K 3/002 |
| GB | 314185 A | | 6/1929 | |
| GB | 2360985 A | | 10/2001 | |
| GB | 2410226 A | | 7/2005 | |
| GB | 2510699 A | * | 8/2014 | ............ B62M 1/32 |
| JP | S 5130033 A | | 3/1976 | |
| JP | H 07329863 A | | 12/1995 | |
| JP | 3073161 U | | 11/2014 | |
| KR | 800000469 B1 | | 5/1980 | |
| KR | 200412875 Y1 | | 3/2006 | |
| TW | 459706 | | 10/2001 | |
| TW | 462350 | | 11/2001 | |
| TW | 462351 | | 11/2001 | |
| TW | 474298 | | 1/2002 | |
| TW | 476321 | | 2/2002 | |
| TW | 496355 | | 7/2002 | |
| WO | WO 96/19206 | | 6/1996 | |
| WO | WO 1999/00290 A1 | | 1/1999 | |
| WO | WO 2004/056647 A1 | | 7/2004 | |
| WO | WO 2010/085283 A1 | | 7/2010 | |

\* cited by examiner

DRIVE TRAIN FOR A TREADLE SCOOTER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present disclosure is directed to treadle scooters, and more particularly to a drive train for a treadle scooter.

BACKGROUND

Treadle scooters have been in use throughout the world for many years and come in a variety of styles. Broadly speaking, a treadle scooter includes a platform (commonly known as a rocker board) that is pivotally attached to a frame and a drive force is provided to a wheel rotatably attached to the frame through a drive train by a user pivoting the platform relative to the frame using his or her feet.

FIG. 1 illustrates a particular form of a prior art treadle scooter 10. The treadle scooter 10 consists of a frame 12 in the form of a simple truss formed by first and second inclined segments 14, 16 connected at their proximal ends with their distal ends joined by a horizontal member 18. The frame 12 of the prior art treadle scooter 10 further consists of a forward member 20. A first wheel 22 is rotatably mounted to a first or front end of the frame 12 at a distal end of the forward member 20. A second wheel 24 is rotatably mounted to a second or rear end of the frame 12 between a pair of stays 16a, 16b, which form the inclined member 16, by an axle 25. More particularly, the first wheel is attached to first end of the frame by means of a head tube 26 that is attached to the distal end of the forward member 20 and receives a steering shaft 28 having a handle bar 30 at its top end. A front fork 32 is attached to a bottom end of the steering shaft 28 and the first wheel 22 is received between opposing legs of the front fork 32 and rotatably attached to the front fork 32 by the axle 34.

In the prior art treadle scooter 10, a drive train 36 is provided to drive rotation of the second wheel 24. The drive train 36 consists of a rocker board 38 which is pivotally attached to the frame 12 at an apex of the inclined segments 14, 16 by a hinge 40 (see FIG. 2). The rocker board 38 consists of a first or front portion 42 and a second or rear portion 44 on opposite sides of the hinge 40. The hinge 40 is located at the lengthwise center of the rocker board 38. The top surface of the first portion 42 and the top surface of the second portion 44 of the rocker board 38 are configured to receive a first and second foot of a user operating the prior art treadle scooter 10. A first one-way clutch 46 is operatively associated with a right side of the second wheel 24 to rotate the second wheel 24 in a drive direction when an actuation pulley 48 fixedly attached to the one-way clutch 46 is rotated in a first direction and to allow free rotation or "freewheeling" of the second wheel when the actuation pulley attached to the first one-way clutch 46 as rotated in a second direction Likewise, a second one-way clutch 50 is operatively associated with the left side of the second wheel 24 to rotate the second wheel 24 in a drive direction when an actuation pulley 52 attached to the second one-way clutch 50 is rotated in a first direction and to allow free rotation of the second wheel 24 when the actuation pulley 52 attached to the second one-way clutch 50 is rotated in a second direction. A guide pulley 54 is rotatably mounted to the frame 12 proximate the front end of the frame 12 and more particularly on the inclined segment 14 and is operatively aligned with the actuation pulley 48 attached to the first one-way clutch 46 to direct a drive line 56 between the guide pulley 54 and the actuation pulley 48. A tensioning pulley 58 is attached by a tensioning spring 60 in the form of a coil spring to the frame proximate the first end of the frame. The drive line 56 is attached at a first end 62 to a bottom of the rocker board 38 proximate a distal end of the front portion 42. The drive line 56 thereafter is wrapped approximately 90° around the guide pulley 54 and approximately 180° around the actuation pulley 48 attached to the first one-way clutch 46. The drive line 56 continues by wrapping 180° around the tensioning pulley 58 and then approximately 90° around the actuation pulley 52 attached to the second one-way clutch 50 and the second end 64 of the drive line 56 is attached to the bottom of the rocker board 38 proximate a distal end of the second end 44 of the rocker board 38. In the prior art embodiment illustrated in FIG. 2, the drive line 56 includes a first chain segment 66 extending between the first end 62 and around the guide pulley 54 and the actuation pulley 48 attached to the first one-way clutch 46 and a second chain segment 68 extending between the second end 64 and the actuation pulley 52 attached to the second one-way clutch 50 and an intermediate cable portion 70 between the first and second chain segments 66, 68 extending around the tensioning pulley 58. In this embodiment the guide pulley 54 and both the actuation pulleys 48, 52 each have radially extending teeth configured to engage the lengths of the respective first and second chain segments in a manner well known in the art. Other embodiments could consist of the drive line 56 being a cable with the teeth of the guide pulley 54 and the actuation pulleys 48, 52 being replaced with a circumferential groove.

Referring to FIG. 3, in use, when the rocker board 38 is actuated by a user to lower the second or rear end 44 of the rocker board, the first or front end 42 of the rocker board and the associated second end of the drive line 62 is pulled upward rotating the actuation pulley 48 and the attached first one-way clutch 46 in the first direction, thereby rotating the second wheel in the drive direction, and rotating the actuation pulley 52 and the attached second one-way clutch 50 in the second direction, allowing free rotation of the second wheel. Referring to FIG. 4, when the rocker board 38 is actuated by the user to lower the first end 42 of the rocker board 38, the second end 44 of the rocker board 38 and associated second end 64 of the drive line 56 is pulled upward rotating the actuation pulley 52 and the attached second locking roller clutch 50 in the first direction, thereby rotating the second wheel 24 in the drive direction and rotating the actuation pulley 48 and the attached first one-way clutch 46 in the second direction, allowing free rotation of the second wheel 24. With no pivoting of the rocker board 38, neither the first nor the second one-way clutches are engaged in the first direction, leaving the second wheel free to rotate in the drive direction One form of one-way clutches known in the art are ratchet clutches 71 schematically illustrated in FIG. 5 consisting of a first ring shaped outwardly extending flange 72 having a plurality of teeth shaped recesses 73 extending around an internal recess of the flange 72. A number of ratchets or fingers 74 are provided (one shown in FIG. 5 for simplicity) which are spring-biased (spring not shown) outwardly to engage the tooth shaped recesses 73 and are shaped and oriented so that the ratchet 71 can freely rotate in one direction 75 but is prevented from rotating in the opposite direction since the fingers are biased to engage the recesses. Such a ratchet structure is described in greater detail in U.S. Pat. No. 7,914,027, the content of which is expressly incorporated by reference herein. Such one-way ratchet clutches have a backlash equal to the ratchet tooth spacing which inhibits immediate actuation of a drive force in use. In addition, such one-way ratchet clutches make a clicking sound when free-wheeling. Furthermore, such one-way ratchet clutches suffer wear during free-wheeling.

A preferred one-way clutch is a locking roller clutch which could include a conventional locking roller clutch 76 shown schematically in FIG. 6 with rollers 77 residing in an outer casing 78 spring biased (spring not shown) to drive up ramps 79 associated with a shaft 80 within the locking roller clutch 76 or locking needle roller clutch 76a shown schematically in FIG. 5 having ramps 79a in an outer casing 78a and rollers 77a directly contacting a shaft 80a or hub residing within the outer casing 78a that are spring-biased (spring not shown) up the ramps 79a. Either form of locking roller clutch provides near instantaneous rotational drive when rotated in a drive direction, is silent when freewheeling and experiences little wear when freewheeling. However, in use, locker roller clutches deployed in a prior art treadle scooter 10 as depicted in FIGS. 1-4 require slightly less chain pull on the left side of the drive train and greater force to be applied to the front of the rocker board 38 in order to drive the second locking roller clutch 50.

The present invention is directed toward overcoming one or more of the problems with prior art treadle scooter drive trains using locking roller clutches.

SUMMARY OF THE EMBODIMENTS

A first aspect of the disclosure is a drive train for a treadle scooter, the treadle scooter comprising a frame having a first end and a second end, the first end of the frame rotatably supporting a first wheel and the second end of the frame rotatably supporting a second wheel. A rocker board is pivotably attached to the frame proximate a lengthwise center of the rocker board between a first portion and a second portion of the rocker board, the rocker board having a top surface configured to receive a first foot of a user on the first portion and a second foot of a user on the second portion and a bottom surface. A tensioning pulley is attached by a tensioning spring to the frame proximate the first end of the frame. A first locking roller clutch is operatively associated with a right side of the second wheel to rotate the second wheel in a drive direction when an actuation pulley operatively associated with the first locking roller clutch is rotated in a first direction and to allow free rotation of the second wheel when the actuation pulley operatively associated with first locking roller clutch is rotated in a second direction. A second locking roller clutch is operatively associated with the left side of the second wheel to rotate the second wheel in a drive direction when an actuation pulley operatively associated with the second locking roller clutch is rotated in a first direction and to allow free rotation of the second wheel when the actuation pulley operatively associated with the second locking roller clutch is rotated in a second direction. A guide pulley attached to the frame proximate the first end of the frame below the rocker board and operatively aligned with the actuation pulley operatively associated with the first locking roller clutch. An auxiliary pulley is attached to the frame above the actuation pulley operatively associated with the second locking roller clutch and operatively aligned therewith. A drive line attached at a first end to the bottom of the rocker board proximate a distal end of the first portion, the drive line thereafter being operatively associated with the guide pulley, the actuation pulley operatively associated with the first locking roller clutch, the tensioning pulley, the actuation pulley operatively associated with the second locking roller clutch, the auxiliary pulley and attached at a second end to the bottom of the rocker board proximate a distal end of the second portion. When the rocker board is actuated by a user to lower the second end of the rocker board, the first end of the drive line is pulled upward rotating the actuation pulley operatively associated with the first locking roller clutch in a first direction, rotating the second wheel in the drive direction and rotating the actuation pulley operatively associated with the second locking roller clutch in the second direction, allowing free rotation of the second wheel. When the rocker board is actuated by a user to lower the first end of the rocker board, the second end of the drive line is pulled upward rotating the actuation pulley operatively associated with the second locking roller clutch in the first direction, rotating the second wheel in the drive direction and rotating the actuation pulley operatively associated with the first locking roller clutch in the second direction allowing, free rotation of the second wheel.

Embodiments further may include the actuation pulley being attached to the frame in a position substantially equalizing the length of drive line pull by the first and second ends of the rocker board acting on the actuation pulleys operatively associated with the first and second locking roller clutches.

Embodiments may include the auxiliary pulley being attached to the frame in a position directing the drive line pull on the actuation pulley operatively associated with the second locking roller clutch from a direction forward of an axis of the actuation pulley operatively associated with the second locking roller clutch.

Embodiments may include an axis of the auxiliary pulley being at about 12 o'clock relative to an axis of the actuation pulley operatively associated with the second locking roller clutch when viewed from the left side of the treadle scooter.

Embodiments may further include a periphery of the auxiliary pulley being in close proximity to a periphery of the actuation pulley operatively associated with the second locking roller clutch. Embodiments include the auxiliary pulley having flanges extending radially on opposing sides of the radially extending teeth beyond the distal ends of the radially extending teeth, the distal ends of the flanges defining the periphery of the auxiliary pulley.

Embodiments may include the drive train being configured such that when a user provides no pivoting of the rocker board, the second wheel freely rotates in the drive direction.

Embodiments may further include the line having a first chain segment extending between the first end and around the guide pulley and the actuation pulley operatively associated with the second locking roller clutch and a second chain segment extending between the second end and around the auxiliary pulley and the actuation pulley operatively associated with the second locking roller clutch and an intermediate cable portion between the first and second chain segments extending around the tensioning pulley and the guide pulley, both the actuation pulleys and the auxiliary pulley having radially extending teeth configured to engage links of the respective first and second chain segments.

Various embodiments of the drive train can equalize the length of the drive line pull by the first and second ends of the rocker board acting on the actuation pulleys operatively associated with first and second locking roller clutches, which equalize the amount of force a user must apply to each side of the rocker board in use. This promotes a feeling to the user that he or she is providing equal power whether the front or rear portion of the rocker board is pushed downward. It further provides for equalization of the power applied to the rear wheel regardless of whether the front or rear portion of the rocker board is depressed. Use of the auxiliary pulley in accordance with the various embodiments also eliminates chain jumping when the user is vigorously pivoting the rocker board. The embodiments may further improve efficient transmission of energy from the rocker board to the drive wheel. Embodiments may also serve to protect a user's fingers from inadvertent pinching between the pulleys and the chain associated with the drive wheel.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described embodiments are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
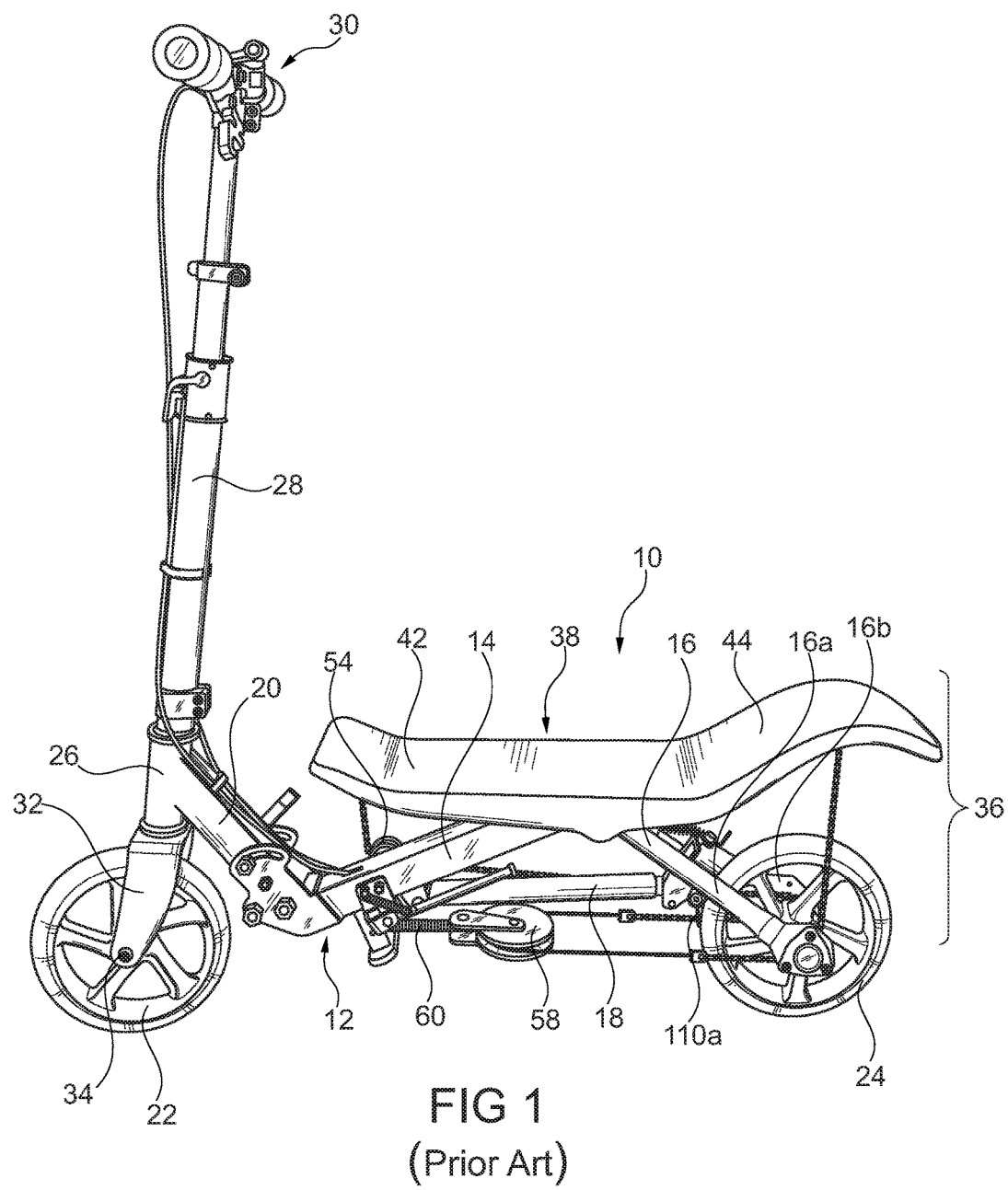
FIG. 1 is perspective view of a prior art treadle scooter featuring a prior art drive train.
Figure 2:
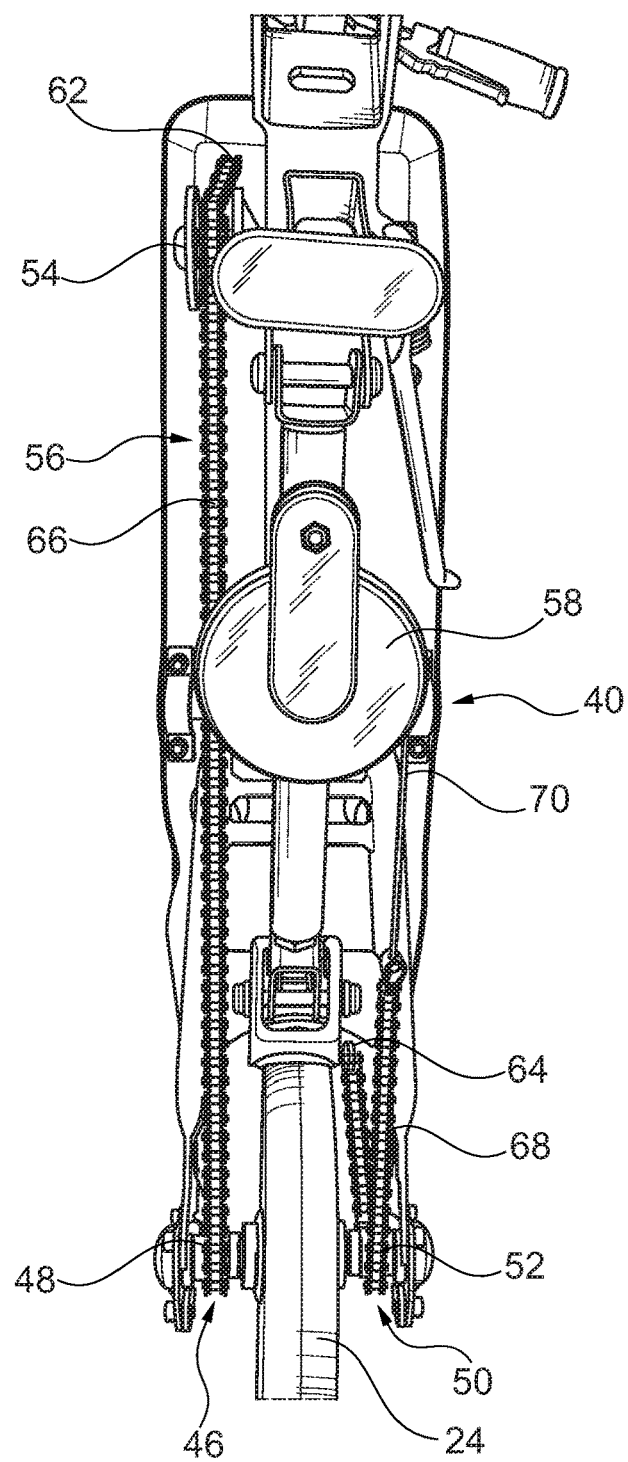
FIG. 2 is a bottom plan view of the treadle scooter of FIG. 1 more clearly illustrating the drive train thereof.
Figure 3:
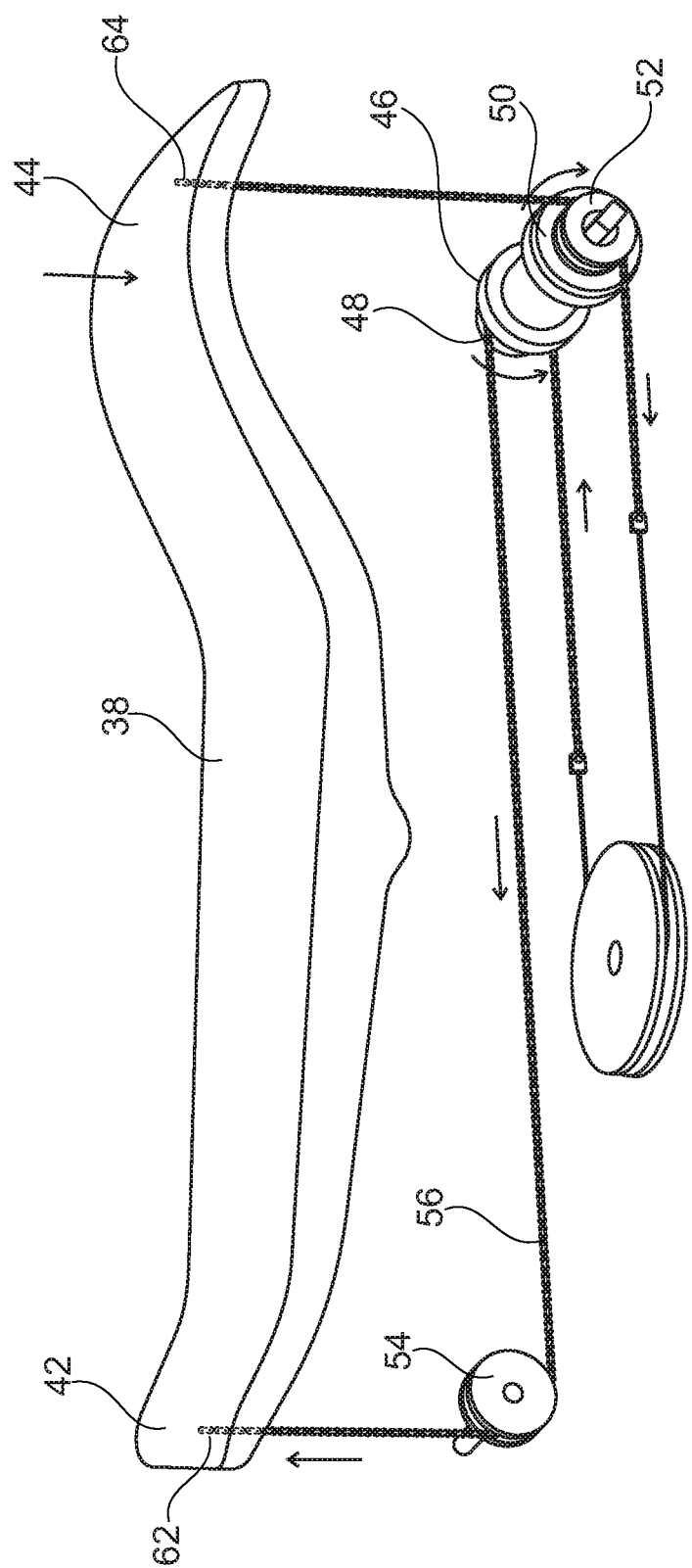
FIG. 3 is a schematic, perspective view of the prior art drive train of FIGS. 1 and 2 illustrating the path of a drive line of the drive train from the left side with a user applying force to the rear of the rocker board.
Figure 4:
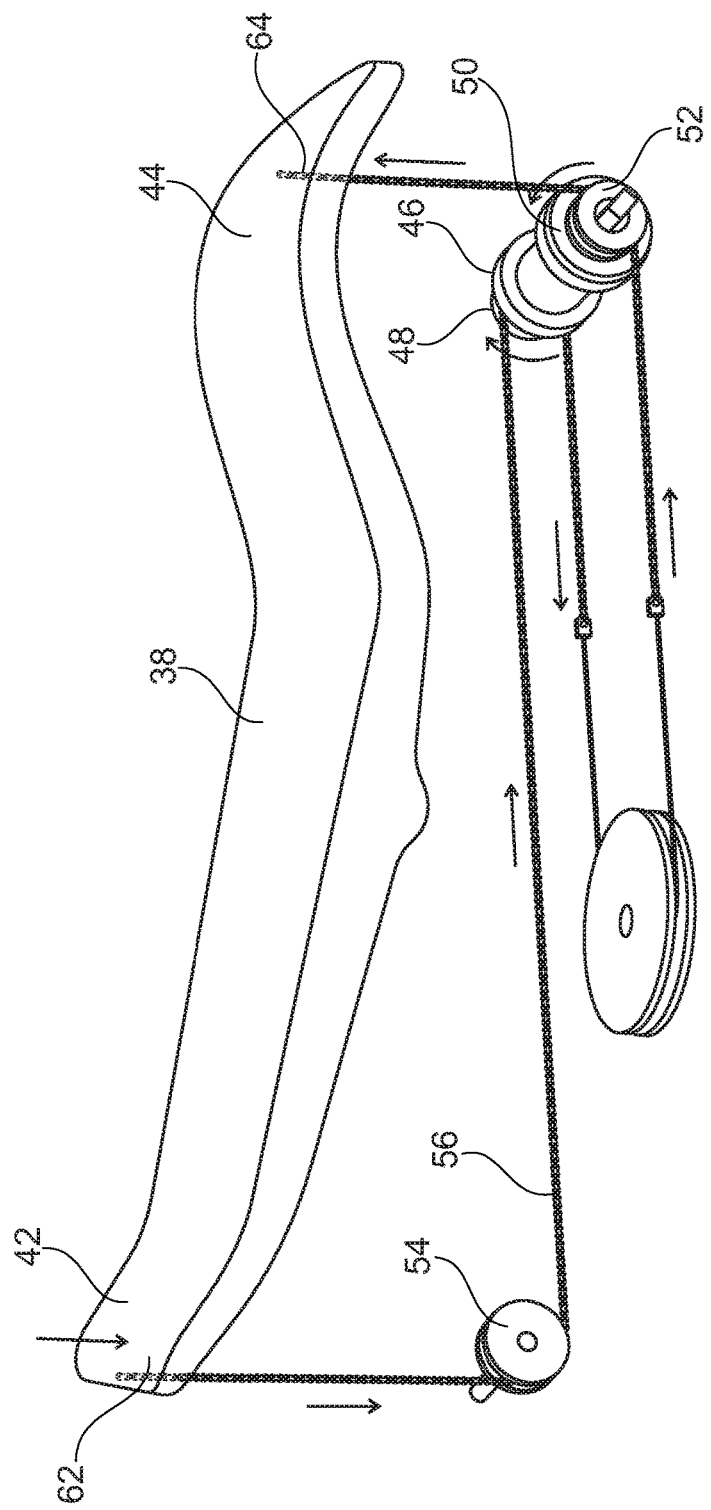
FIG. 4 is a schematic, perspective view of the prior art drive train of FIGS. 1 and 2 illustrating the path of a drive line of the drive train from the left side with a user applying force to the front of the rocker board.
Figure 5:
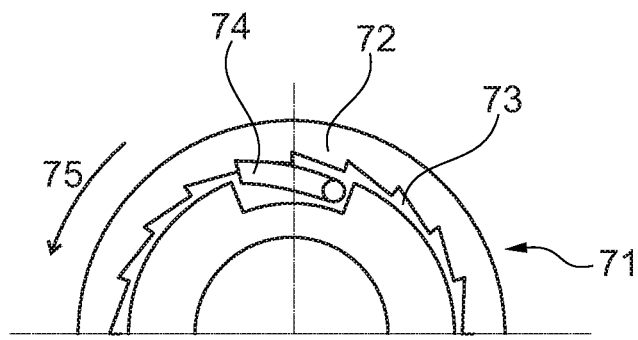
FIG. 5 is a schematic front elevation view of a ratchet clutch.
Figure 6:
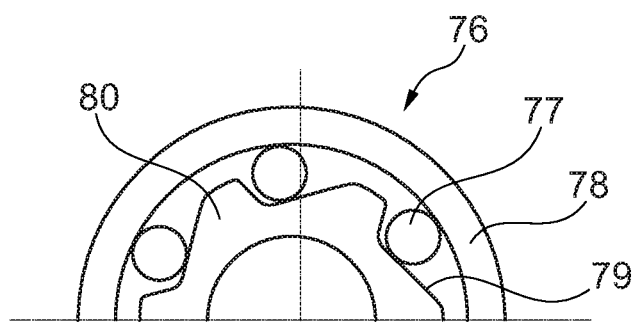
FIG. 6 is a schematic front elevation view of a conventional locking roller clutch.
Figure 7:
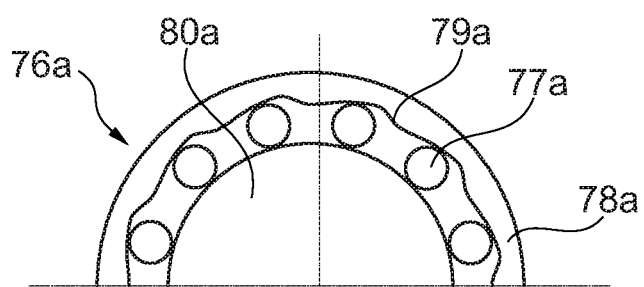
FIG. 7 is a schematic front elevation view of a locking needle roller clutch
Figure 8:
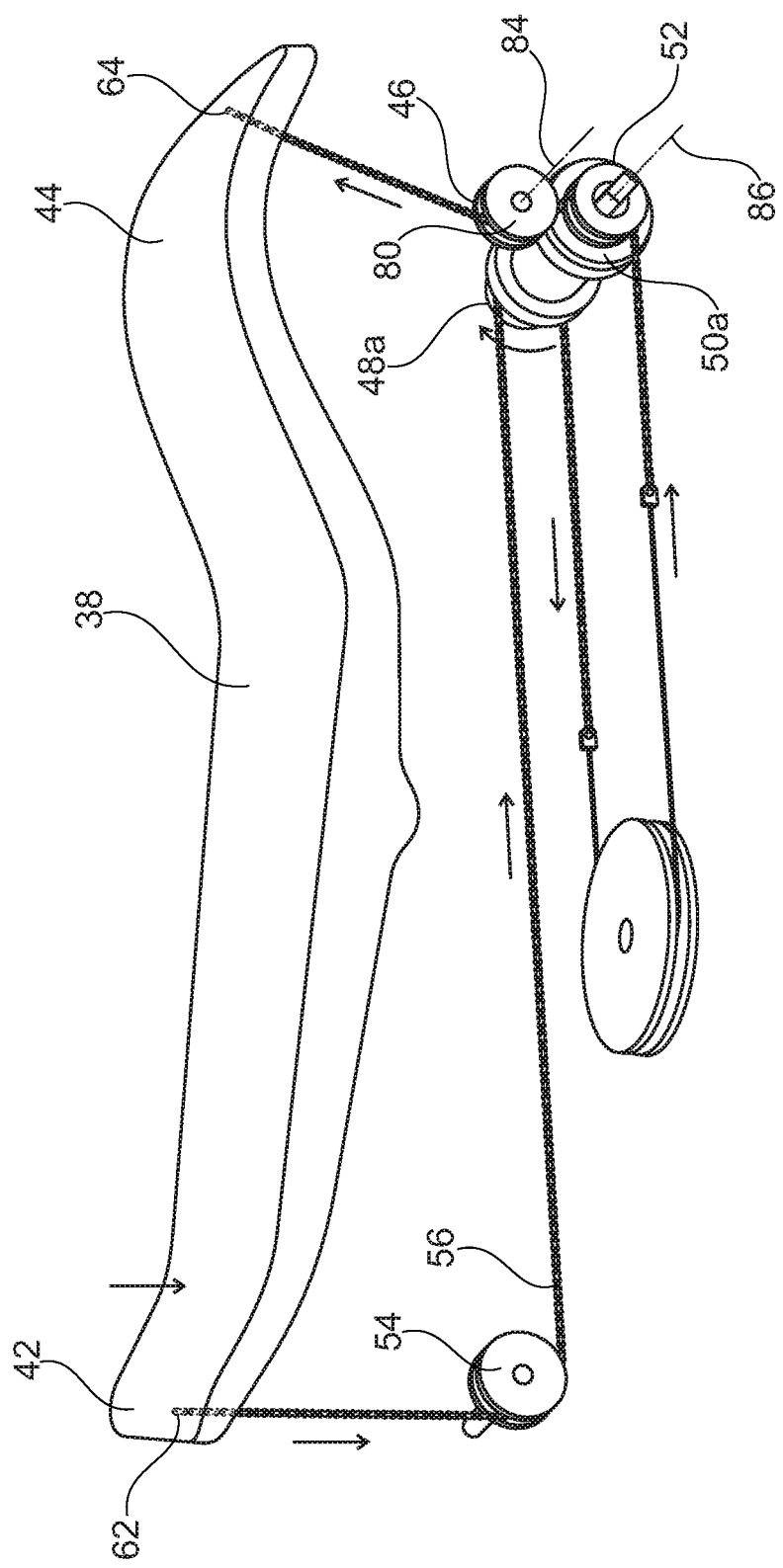
FIG. 8 is a schematic, perspective view of an embodiment of a drive train including an auxiliary pulley viewed from the left side.
Figure 9:
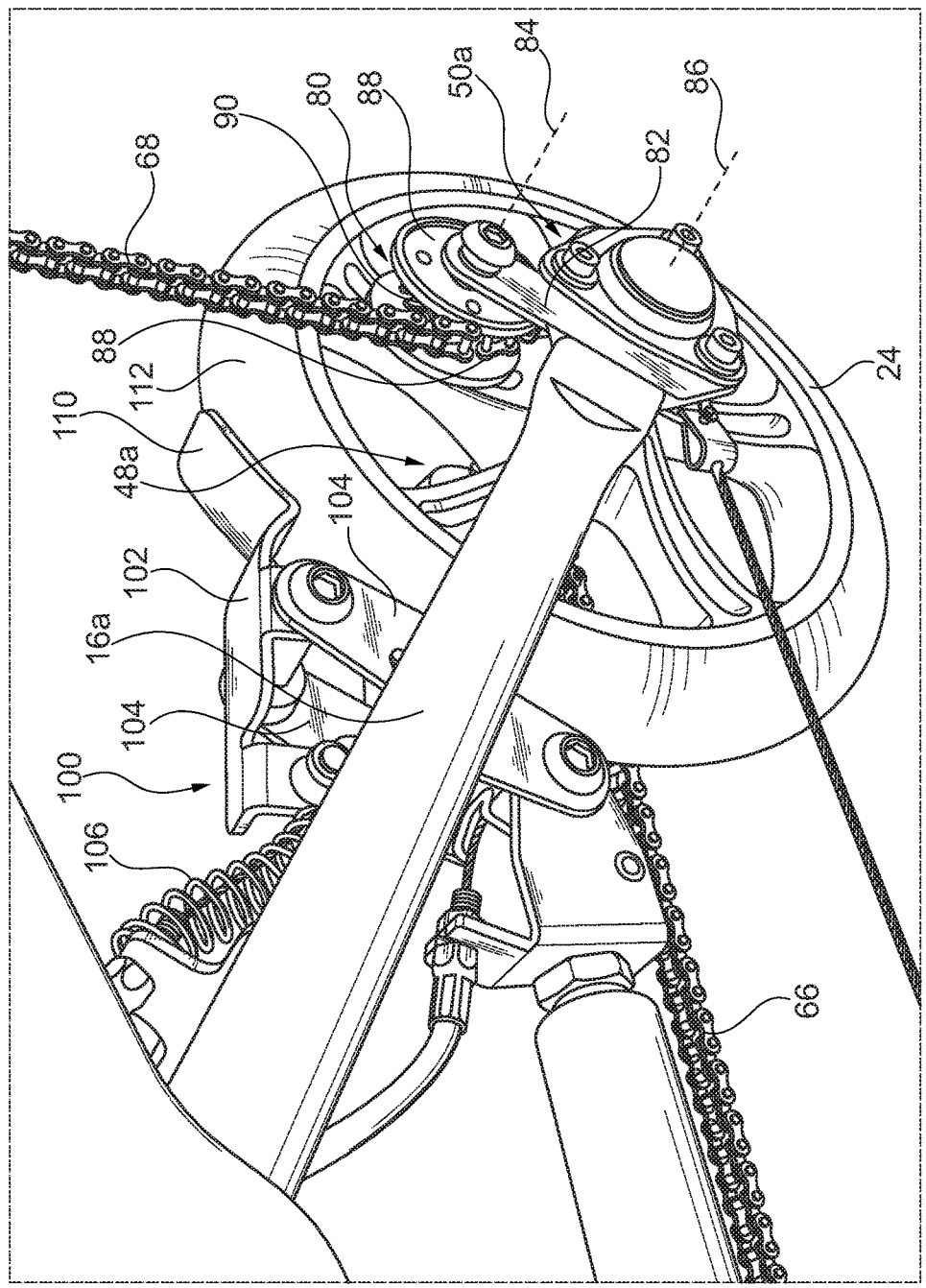
FIG. 9 is a perspective view of the path of the drive line of the embodiment illustrated in FIG. 8 showing a drive line comprising first and second chain segments and an intermediate cable portion therebetween.

FIG. 8 schematically illustrates an embodiment of the drive train in accordance with the present disclosure. The drive train is largely as described above with reference to prior art FIGS. 1-4, but includes an auxiliary pulley 80 attached to the rear left inclined member 16a by a bracket 82 above the actuation pulley 52 attached to the second one-way clutch 50, which in the embodiment of FIG. 8 is a locking roller clutch 50a. Referring to FIGS. 8 and 9, an axis 84 of the auxiliary pulley 80 is positioned at about 12 o'clock relative to an axis 86 of the second locking roller clutch 50a. Referring to FIG. 9, the auxiliary pulley 80 has a pair of radial flanges 88 on opposing sides of the radially extending teeth 90 and extend radially beyond the radially extending teeth 90. The periphery of the radial flanges 88 forms the periphery of the auxiliary pulley 80. The periphery of the auxiliary pulley 80 as seen in FIGS. 8 and 9 is in close proximity to a periphery of the actuation pulley 52 attached to the second locking roller clutch 50a. In this manner, a user's fingers are prevented from coming between the auxiliary pulley 80 and the second locking roller clutch 50a. The radially extending flanges 88 function both to prevent a user's finger from being caught in the auxiliary pulley 80 and to minimize the possibility of the second chain segment 68 becoming disengaged from the pulley teeth. In this position the auxiliary pulley 80 functions to substantially equalize the length of drive line pull by the first and second ends of the rocker board 38 actuating the actuation pulley attached to the first and second locking roller clutches 48a, 50a. In addition, in this position the drive line is connected to pull on the actuation pulley 52 attached to the second locking roller clutch 50a from a direction forward of an axis of the actuation pulley 52 attached to the second locking roller clutch 50a. In this manner, the direction of chain pull is similar to that provided on the first locking roller clutch 48a (see FIGS. 3 and 8). This location of the auxiliary pulley also causes more than 90° of drive line to wrap around the actuation pulley 52.

FIG. 9 also illustrates a location for a brake 100 to maximize braking power. As illustrated in FIG. 9, the brake 100 comprises a brake arm 102 pivotably connected to attachment brackets 104 extending from the stays 16a and 16b. A brake cable 106 is attached to a first end of the brake arm 102 and actuated by the brake lever 108 tensioning the brake cable 106. This pivots the brake shoe 110 into contact with a running surface 112 of the second wheel 24. The spring 112 biases the brake arm 102 with the brake shoe 110 out of contact with the running surface 112. The brake 100 is positioned relative to the second wheel 24 so that the wheel spins into the brake shoe 110 driving it toward the stays 16a, 16b and causing application of an enhanced braking force to the running surface 112. Thus, the effect on the running surface 112 rotating wheel 24 contacting the brake shoe 110 enhances the brake effectiveness over a prior art brake located as viewed in FIG. 1, where a brake shoe 110a contacts the running surface of a wheel without the possibility of the spinning wheel driving the brake shoe toward the frame 12 or positively effecting the braking force.

What is claimed is:

1. A drive train for a treadle scooter, the treadle scooter comprising a frame having a first end and a second end, the first end of the frame rotatably supporting a first wheel and the second end of the frame rotatably supporting a second wheel, the drive train comprising:
    a rocker board pivotably attached to the frame proximate a lengthwise center of the rocker board between a first portion and a second portion of the rocker board, the rocker board having a top surface configured to receive a first foot of a user on the first portion and a second foot of a user on the second portion and a bottom surface;
    a tensioning pulley attached by a tensioning spring to the frame proximate the first end of the frame;
    a first locking roller clutch operatively associated with a right side of the second wheel to rotate the second wheel in a drive direction when an actuation pulley operatively associated with the first locking roller clutch is rotated in a first direction and to allow free rotation of the second wheel when the actuation pulley operatively associated with first locking roller clutch is rotated in a second direction;
    a second locking roller clutch operatively associated with the left side of the second wheel to rotate the second wheel in a drive direction when an actuation pulley operatively associated with the second locking roller clutch is rotated in a first direction and to allow free rotation of the second wheel when the actuation pulley operatively associated with the second locking roller clutch is rotated in a second direction;
    a guide pulley attached to the frame proximate the first end of the frame below the rocker board and operatively aligned with the actuation pulley operatively associated with the first locking roller clutch;
    an auxiliary pulley attached to the frame above the actuation pulley operatively associated with the second locking roller clutch and operatively aligned therewith; and
    a drive line attached at a first end to the bottom of the rocker board proximate a distal end of the first portion, the drive line thereafter being operatively associated with the guide pulley, the actuation pulley operatively associated with the first locking roller clutch, the tensioning pulley, the actuation pulley operatively associated with the second locking roller clutch, the auxiliary pulley and attached at a second end to the bottom of the rocker board proximate a distal end of the second portion, wherein when the rocker board is actuated by a user to lower the second end of the rocker board, the first end of the drive line is pulled upward rotating the actuation pulley operatively associated with the first locking roller clutch in a first direction, rotating the second wheel in the drive direction and rotating the actuation pulley operatively associated with the second locking roller clutch in the second direction allowing free rotation of the second wheel, and when the rocker board is actuated by a user to lower the first end of the rocker board, the second end of the drive line is pulled upward rotating the actuation pulley operatively associated with the second locking roller clutch in the first direction, rotating the second wheel in the drive direction and rotating the actuation pulley operatively associated with the first locking roller clutch in the second direction allowing free rotation of the second wheel.

2. The drive train of claim 1 wherein the auxiliary pulley is attached to the frame in a position substantially equalizing the length of drive line pull by the first and second ends of the rocker board acting on the actuation pulleys operatively associated with the first and second locking roller clutches.

3. The drive train of claim 1 wherein the auxiliary pulley is attached to the frame in a position directing the drive line pull on the actuation pulley operatively associated with the second locking roller clutch from a direction forward of an axis of the actuation pulley operatively associated with the second locking roller clutch.

4. The drive train of claim 1 wherein when viewed from the left side, an axis of the auxiliary pulley is at about 12 o'clock relative to an axis of the actuation pulley operatively associated with the second locking roller clutch.

5. The drive train of claim 1 wherein when viewed from the left side, a periphery of the auxiliary pulley is in close proximity to a periphery of the actuation pulley operatively associated with the second locking roller clutch.

6. The drive train of claim 5 wherein the auxiliary pulley comprises flanges extending radially on opposing sides of the radially extending teeth beyond distal ends of the radially extending teeth, the distal ends of the flanges defining the periphery of the auxiliary pulley.

7. The drive train for a treadle scooter of claim 1 wherein when a user provides no pivoting of the rocker board, the second wheel freely rotates in the drive direction.

8. The drive train of claim 1 wherein the drive line comprises a first chain segment extending between the first end and around the guide pulley and the actuation pulley operatively associated with the second locking roller clutch and a second chain segment extending between the second end and around the auxiliary pulley and the actuation pulley operatively associated with the second locking roller clutch and an intermediate cable portion between the first and second chain segments extending around the tensioning pulley and the guide pulley, both the actuation pulleys and the auxiliary pulley each have radially extending teeth configured to engage links of the respective first and second chain segments.

9. A treadle scooter including the drive train of claim 1.

* * * * *